July 7, 1959

J. A. SPEROW 2,893,179

GAUGE CLAMP FOR SHARPENING TOOLS

Filed Nov. 15, 1956

INVENTOR.
JAMES A. SPEROW
BY
*Albert J. Kramer*
ATTORNEY

United States Patent Office 2,893,179
Patented July 7, 1959

2,893,179
GAUGE CLAMP FOR SHARPENING TOOLS

James A. Sperow, San Francisco, Calif.

Application November 15, 1956, Serial No. 622,490

5 Claims. (Cl. 51—221)

This invention relates to sharpening tools and it is more particularly concerned with a device for correctly holding an object to be sharpened, such as the blades of various types of scissors, planing blades, and other cutting tools in which beveling develops the cutting edge of the tool.

One of the objects of the invention is the provision of a device of the type mentioned which is adjustable to fit different bevel angles and which can be used to apply a precision bevel to the edge of the tool to be sharpened.

Another object of the invention is the provision of a tool of the type mentioned which is accurate, easy to use, long wearing, and simple and inexpensive to construct and manufacture.

A still further object of the invention is the provision of such a tool in the form of a clamp with angular jaws for holding the object to be operated upon, and an adjustable member in cooperative relation therewith as a guide for an abrasive surface to be used on the object.

These and other objects, advantages, and features of the invention will be more fully apparent from the following description considered together with the accompanying drawing.

Figure 1:
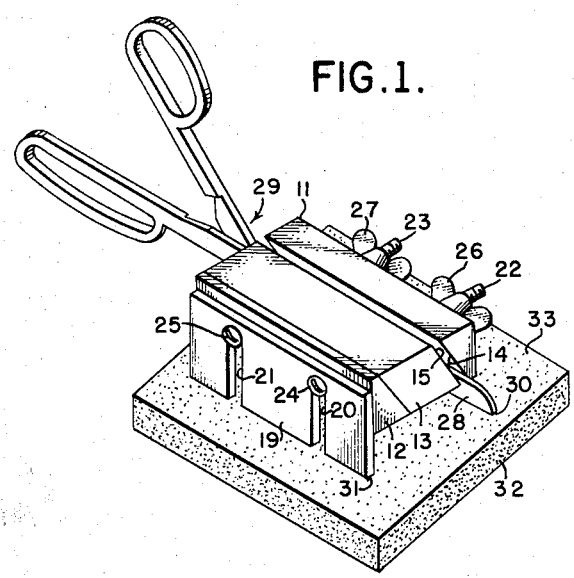
Fig. 1 is a perspective view of an embodiment of the invention in actual use to sharpen a blade of a pair of scissors.
Figure 3:
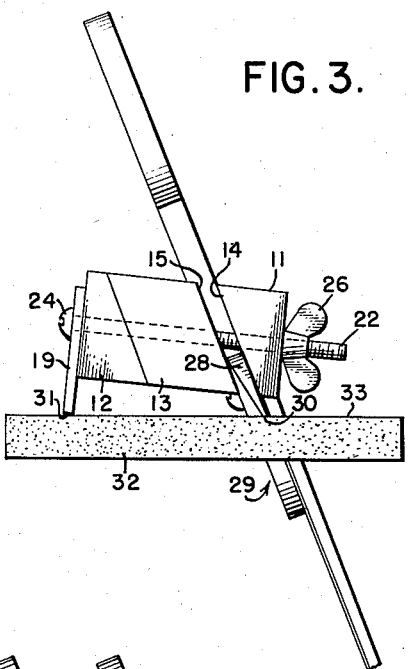
Fig. 3 is an end view of the members shown in Fig. 1.
Figure 2:
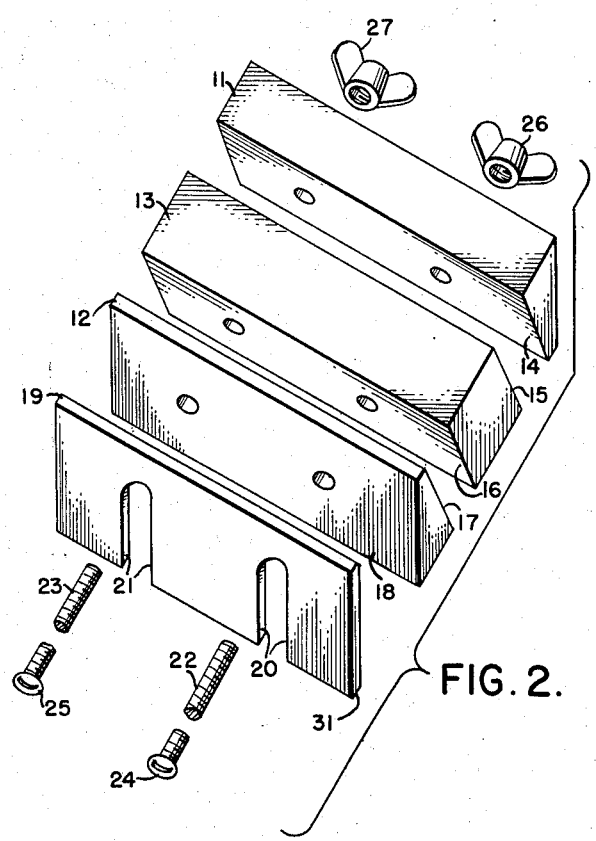
Fig. 2 is an exploded perspective view of the embodiment.

Referring with more particularity to the drawing in which like numerals designate like parts, the embodiment illustrated comprises a clamping block having two end pieces 11 and 12 of trapezoidal cross section and an intermediate piece 13 of a parallelogram cross section, forming thus two sets of clamping jaws, one being between the inner sloping face 14 of the block piece 11 and an adjacent face 15 of the intermediate piece 13, and the other being between the face 16 on the opposite side of the piece 13 and the adjacent sloping face 17 of the piece 12.

Against the outer end face 18 of the block piece 12, a plate 19 is set having transverse slots 20 and 21. A pair of clamping bolts 22 and 23 are provided and they pass through the slots 20 and 21, respectively, and corresponding longitudinal apertures in the pieces 11, 12 and 13. The heads 24 and 25 of these bolts press against the face of the plate 19 to hold it in any desired adjusted position. The opposite end of the bolts 22 and 23 extend beyond the block piece 11 and are provided with wing nuts 26 and 27 for releasibly applying the necessary clamping pressure.

To use the device, the blade to be sharpened, say a blade 28 of a scissors 29, is placed between adjacent sloping faces of a pair of clamping jaws, such as the faces 14 and 15 with the beveled edge 30 of the blade on the outside of the clamping jaws and oriented to slope downwardly from the plate 19. At the same time, the plate 19 is adjusted in height so that its upper edge 31 is in alignment with the desired beveled edge 30 of the blade 28 to be operated upon. A honing stone 32 having a flat abrasive surface 33 is then placed across the edge 31 of the plate 19 and the beveled edge 30 and moved back and forth until the blade is sharpened. The plate 19 should be of a very hard material, such as stainless steel, and should be kept well oiled to prevent or minimize abrasion and wearing away under the action of the honing stone.

Figure 4:
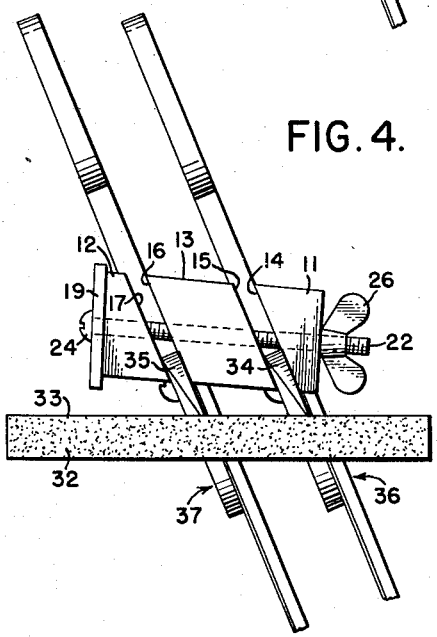
Fig. 4 is an end view of the embodiment showing how two blades can be sharpened simultaneously.

By providing two clamping members, two objects may be operated upon simultaneously. Moreover, this may be done without using the plate 19 because the plate 19 becomes redundant under such circumstances. This is illustrated in Fig. 4 showing blades 34 and 35 of scissors 36 and 37, respectively, in proper position for honing on the device without the use of the plate 19.

Additional clamping jaws may be provided, if desired, the two illustrated being representative of any plurality desired. Also, the angularity of the jaws in relation to the plate 19 may be varied to suit any particular bevel angle or range of bevel angles desired.

The device itself need not be of a large size. It may be of a size that can be held in the hand for many types of work, including the usual kinds of scissors found in the home, barber shops, beveled implements of physicians and dentists and beveled tools in mechanical work shops. However, it is to be understood that this invention is also applicable to larger types of tools and can be used in large sizes for that purpose without departing from the spirit and scope of the appended claims.

Having thus described my invention, I claim:

1. A gauge clamp for holding a beveled member to be sharpened, comprising a block having a pair of parallel clamping jaws at an angle to one of its faces for gripping therebetween an object to be sharpened, a plate slidably carried by the block on a side of the block adjacent said face in spaced relation to the clamping jaws, said plate having a straight edge normally projecting beyond said face and means for adjustably securing the plate against relative movement on the block to vary the position of the straight edge in relation to the plane of the said face and for releasibly holding the clamping jaws parallel to each other in different clamping positions.

2. A gauge clamp for holding objects that have beveled edges to be sharpened, said clamp comprising complementary block sections forming together a block having top and bottom sides in parallel planes, said sections having parallel adjacent faces inclined to the planes of said top and bottom sides, a plate carried by one of said sections at one end of the block, said plate having a straight edge normally projecting below the plane of the bottom side, and means for holding said plate and said sections together and for releasibly securing the sections against objects placed between said faces.

3. A gauge clamp for holding objects that have beveled edges to be sharpened, said clamp comprising three complementary block sections arranged in tandem and forming together a block having top and bottom sides in parallel planes, said sections having parallel adjacent faces inclined to the planes of said top and bottom sides, a plate carried by one of said sections at one end of the block, said plate having a straight edge normally projecting below the plane of the bottom side, and means for holding said plate and said sections together and for releasibly securing the sections against objects placed between said faces.

4. A gauge clamp for holding objects that have beveled edges to be sharpened, said clamp comprising two end block sections and an intermediate block section forming together a block having top and bottom sides in parallel planes, said intermediate section having faces adjacent to and parallel to faces of the end sections, said faces being in planes inclined to the planes of the said top and bottom sides, a plate carried by one of said end sections, said plate having a straight edge normally projecting below the plane of the bottom side, and means for holding said plate and said sections together and for releasibly securing the sections against objects placed between said faces.

5. A gauge clamp as defined by claim 4 in which the holding means comprises threaded bolts passing through the block sections parallel to the top and bottom sides, and transversely of the said faces, said bolts having heads on one side of the block and wing nuts on the opposite side, said plate having slots therethrough engaging the shanks of the bolts between the heads thereof and the end block section on which it is carried.

References Cited in the file of this patent

UNITED STATES PATENTS

| | | |
|---|---|---|
| 1,054,370 | Tomlinson | Feb. 25, 1913 |
| 1,246,507 | Waddell | Nov. 13, 1917 |
| 2,518,111 | Amendola | Aug. 8, 1950 |

FOREIGN PATENTS

| | | |
|---|---|---|
| 1,443 | Great Britain | Apr. 25, 1874 |
| 21,996 | Great Britain | June 25, 1914 |